(12) United States Patent
Liao

(10) Patent No.: US 9,000,618 B2
(45) Date of Patent: Apr. 7, 2015

(54) TRANSMISSION LINE DRIVER AND METHOD FOR DRIVING THE SAME

(75) Inventor: Su-liang Liao, HsinChu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1177 days.

(21) Appl. No.: 12/879,507

(22) Filed: Sep. 10, 2010

(65) Prior Publication Data

US 2011/0062781 A1   Mar. 17, 2011

(30) Foreign Application Priority Data

Sep. 11, 2009 (TW) ................. 98130717 A (51) Int. Cl.
  *G05F 1/10* (2006.01)
  *H01H 51/34* (2006.01)
  *H04L 25/02* (2006.01)

(52) U.S. Cl.
  CPC .................. *H04L 25/0282* (2013.01)

(58) Field of Classification Search
  CPC ......... H02G 7/20; H02J 3/1814; Y02E 40/18; G05F 3/30; G05F 3/262; G05F 3/265
  USPC ............. 307/98; 327/108, 538, 539, 535; 323/312–316, 280, 281; 363/22, 13, 363/23; 375/257
  See application file for complete search history.

(56) References Cited

U.S. PATENT DOCUMENTS

| | | | |
|---|---|---|---|
| 6,343,024 B1 * | 1/2002 | Zabroda | 363/22 |
| 6,362,612 B1 * | 3/2002 | Harris | 323/312 |
| 6,522,179 B2 | 2/2003 | Ferianz | |
| 8,022,736 B2 * | 9/2011 | Chang et al. | 327/108 |
| 2005/0195904 A1 * | 9/2005 | Huang et al. | 375/257 |

* cited by examiner

Primary Examiner — Rexford Barnie
Assistant Examiner — Jagdeep Dhillon
(74) Attorney, Agent, or Firm — McClure, Qualey & Rodack, LLP (57) ABSTRACT

A transmission line driver and a method for driving the same are provided, in which a composite current source is provided as an input current source, such that an output voltage is fixed. The composite current source includes an internal current source and an external current source. The composite current source is supplied to a single-ended transmission line driver or a differential transmission line driver, such that the output voltage is fixed.

10 Claims, 8 Drawing Sheets

TRANSMISSION LINE DRIVER AND METHOD FOR DRIVING THE SAME

CROSS-REFERENCES TO RELATED APPLICATIONS

This non-provisional application claims priority under 35 U.S.C. §119(a) on Patent Application No. 98130717 filed in Taiwan, R.O.C. on 2009 Sep. 11, the entire contents of which are hereby incorporated by reference.

BACKGROUND

1. Technical Field

The disclosure relates to a driver, and more particularly to a transmission line driver and a method for driving the same.

2. Related Art

A common transmission line driver is a voltage buffer, which drives a loading resistor by providing an output current, in which an impedance-matching resistance value may change according to a length of a driven cable, work environment, or other external factors. In addition, in order to drive the loading resistor effectively, the transmission line driver must maintain a larger output voltage, a higher linearity, a better power efficiency, and a better impedance matching of the transmission line.

Two types of conventional modes for driving the transmission line exist, a voltage source driving mode and a current source driving mode. In current source driving technology, a current signal is used to push a load impedance $R_L$ of the transmission, so as to generate a sufficient amplitude of an output voltage, such that the transmission line may transmit a signal.

Figure 1:
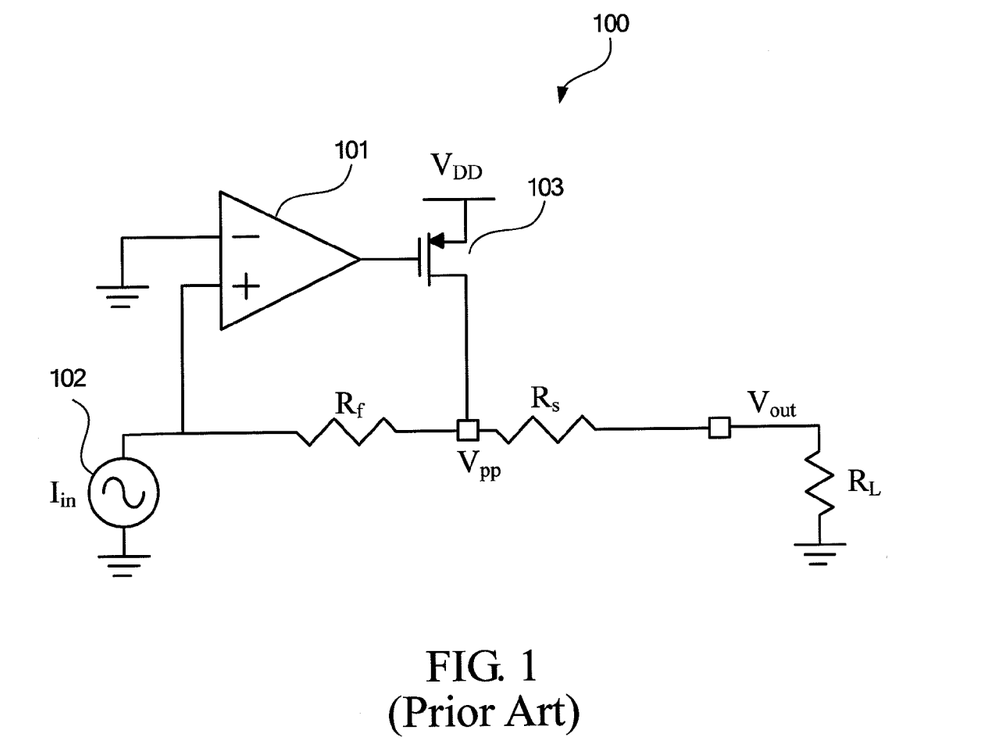
FIG. 1 is a circuit diagram of a single-ended transmission line driver according to a first embodiment.

FIG. 1 is a circuit diagram of a transmission line driver 100 driven by a current source. The transmission line driver 100 includes an amplifier 101, a current source 102, a transistor 103, an impedance matching resistor $R_s$, a loading resistor $R_L$, and a feedback resistor $R_f$. The feedback resistor $R_f$ is coupled to the current source 102. The transistor 103 has one end coupled to a circuit voltage source $V_{DD}$ and the other end coupled to the other end of the feedback resistor $R_f$. The amplifier 101 has an input end coupled to the feedback resistor $R_f$ and the current source 102 and an output end coupled to a gate of the transistor 103. The impedance matching resistor $R_s$ is coupled between the feedback resistor $R_f$ and the loading resistor $R_L$. The impedance matching resistor $R_s$ theoretically matches the loading resistor $R_L$. Otherwise, problems of signal reflection and power consumption occur easily. It should be noted that the current source 102 is an internal current source, and is generated by providing a voltage for an internal resistor.

During production process, the circuit in FIG. 1 may incur problems due to process variation when an integrated circuit (IC) is manufactured. During the manufacturing of the IC, the production process of the common resistor may have a variation possibility of 20%. This variation may result in a corresponding variation of the impedance matching resistor of the transmission line driver, such that the output voltage may be changed to a certain degree. In other words, the values of the feedback resistor $R_f$ and the impedance matching resistor $R_s$ are different from the designed values due to the process variation, resulting in the problem that the output impedance is changed and the output voltage is unstable.

Figure 2:
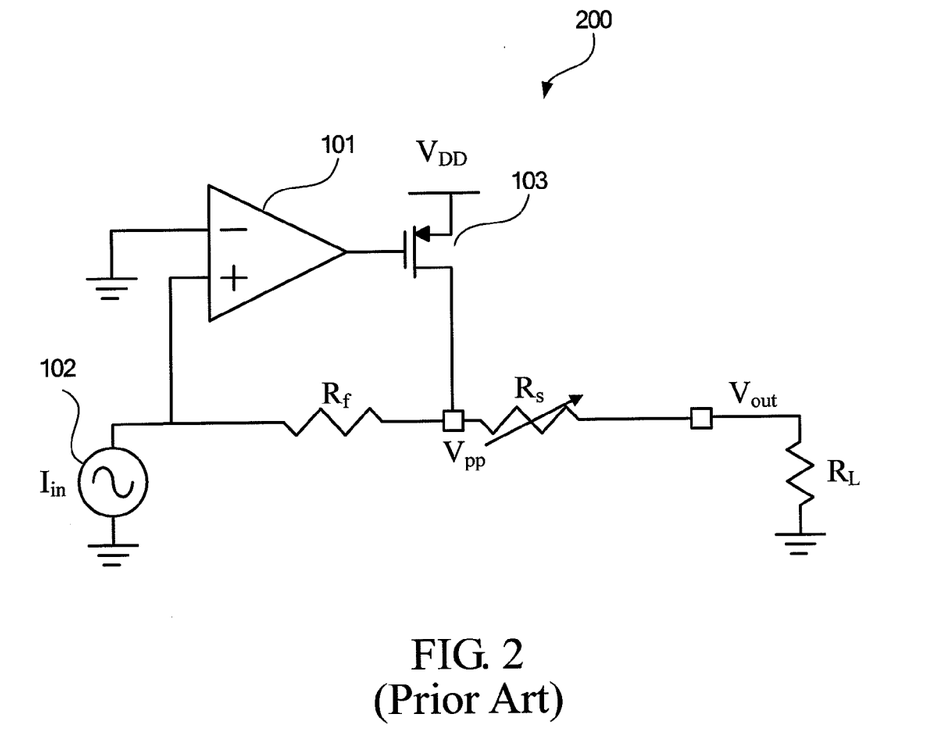
FIG. 2 is a circuit diagram of a single-ended transmission line driver according to a second embodiment.

FIG. 2 is a circuit diagram of a transmission line driver 200 driven by a current source. The transmission line driver 200 includes an amplifier 101, a current source 102, a transistor 103, an adjustable impedance matching resistor $R_s$, a loading resistor $R_L$, and a feedback resistor $R_f$. After production the adjustable impedance matching resistor $R_s$ is adjustable to match the loading resistor $R_L$, such that the output voltage $V_{out}$ is fixed. Meanwhile, a value of the adjustable impedance matching resistor $R_s$ may be fixed through the calibration. However, the mode increases production costs. It should be noted that the current source 102 is an internal current source, and is generated by providing a voltage for an internal resistor.

Figure 3:
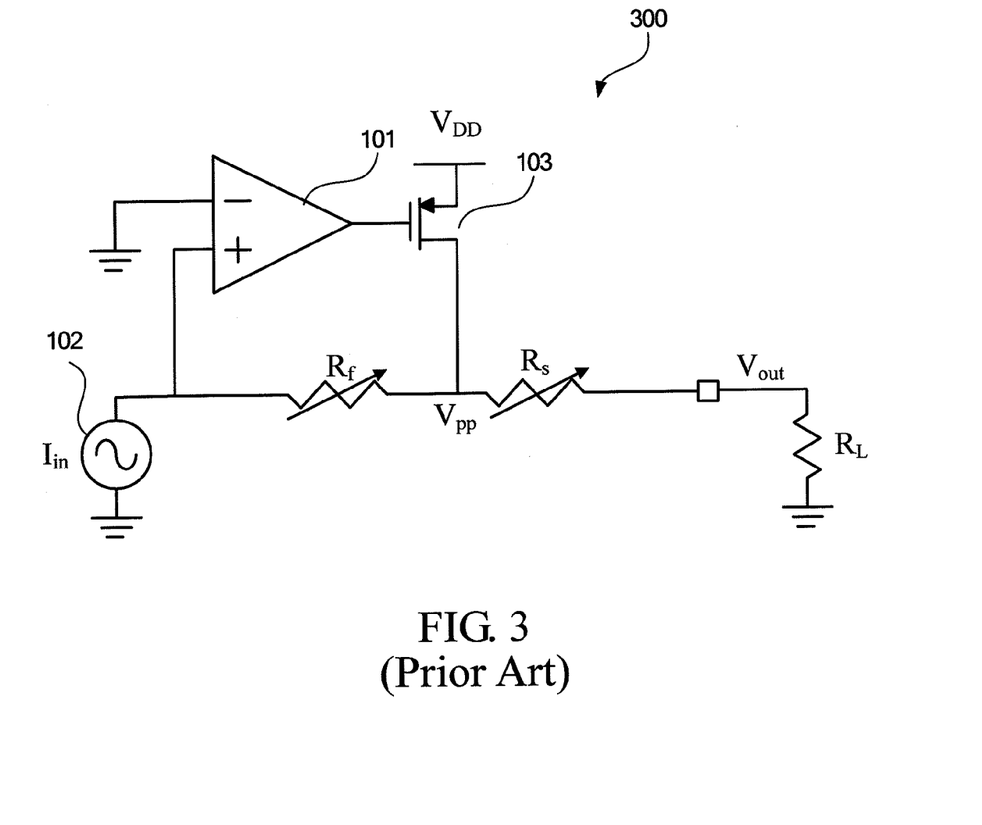
FIG. 3 is a circuit diagram of a single-ended transmission line driver according to a third embodiment.

FIG. 3 is a circuit diagram of a transmission line driver 300 driven by a current source, in which another solution is shown. The transmission line driver 300 includes an amplifier 101, a current source 102, a transistor 103, an adjustable impedance matching resistor $R_s$, a loading resistor $R_L$, and an adjustable feedback resistor $R_f$. After production, the adjustable impedance matching resistor $R_s$ is adjustable to match the loading resistor $R_L$, such that the output voltage $V_{out}$ is fixed. Meanwhile, a value of the adjustable impedance matching resistor $R_s$ may be fixed through the calibration. In addition, the adjustable feedback resistor $R_f$ is adjustable, such that output of a reference voltage $V_{pp}$ is fixed, and the output of the $V_{out}$ may further satisfy a technical demand. However, the mode also increases production costs. It should be noted that the current source 102 is an external current source, generated by providing a voltage for an external resistor.

Thus in the prior art, the output voltage $V_{out}$ is fixed and the output impedance is fixed through the calibration of the impedance matching resistor. Although the problems of impedance matching and the outputting fixing may be solved, the cost is high. In addition, it is not practical to produce a circuit which completely matches design preferences, which is the major point of consideration in the design of the transmission line driver in order to obtain the optimal cost performance ratio, that is, to satisfy product quality demand and ensure the lowest production cost. For example, in certain application products, the impedance matching allows an error of 20% and the voltage change allows an error of 5%, so that the product design with the lowest cost is more competitive, according to this standard.

SUMMARY

The disclosure provides a transmission line driver, for driving a transmission line having a load impedance, which includes a composite current source and a gain circuit. The composite current source includes an internal current source and an external current source. The internal current source is generated by a bandgap voltage and an internal reference resistor. The external current source is generated by a bandgap voltage and an external reference resistor. The gain circuit is coupled to the composite current source, for generating an output voltage, and driving the transmission line by providing the output voltage through the load impedance.

The disclosure further provides a method of driving a transmission line, for driving a transmission line having a load impedance, which includes the following steps. A composite current is provided for a gain circuit, so as to generate an output voltage. The transmission line is driven by providing the output voltage through the load impedance. The composite current includes an internal current part and an external current part.

In the transmission line driver and the method for driving the same according to the disclosure, the internal current and the external current are matched so as to provide a composite current for the transmission line driver, such that the transmission line driver can provide a fixed output voltage.

The detailed features and advantages of the disclosure are described below in great detail through the following embodiments, and the content of the detailed description is sufficient for those skilled in the art to understand the technical content of the disclosure and to implement the disclosure there accordingly. On the basis of the content of the specification, the claims, and the drawings, those skilled in the art can easily understand the relevant objectives and advantages of the disclosure.

DETAILED DESCRIPTION

The disclosure provides a composite current source as an input current source, so as to stabilize an output voltage. The composite current source $I_{mix}$ includes two parts, which are an internal current source ($i_b$) and an external current source ($i_{bx}$). The internal current source ($i_b$) is generated by a bandgap voltage and an internal reference resistor, and the external current source ($i_{bx}$) is generated by the bandgap voltage and an external reference resistor. The internal reference resistor is an internal resistor parameter when an IC is manufactured, and the external reference resistor is a resistor parameter of an IC external element. The internal current source is the current source ($i_b$) adopted in the prior art, and the external current source ($i_{bx}$) is formed by an IC external resistor. After the two current sources are combined, the objectives of the disclosure are achieved.

Figure 4:
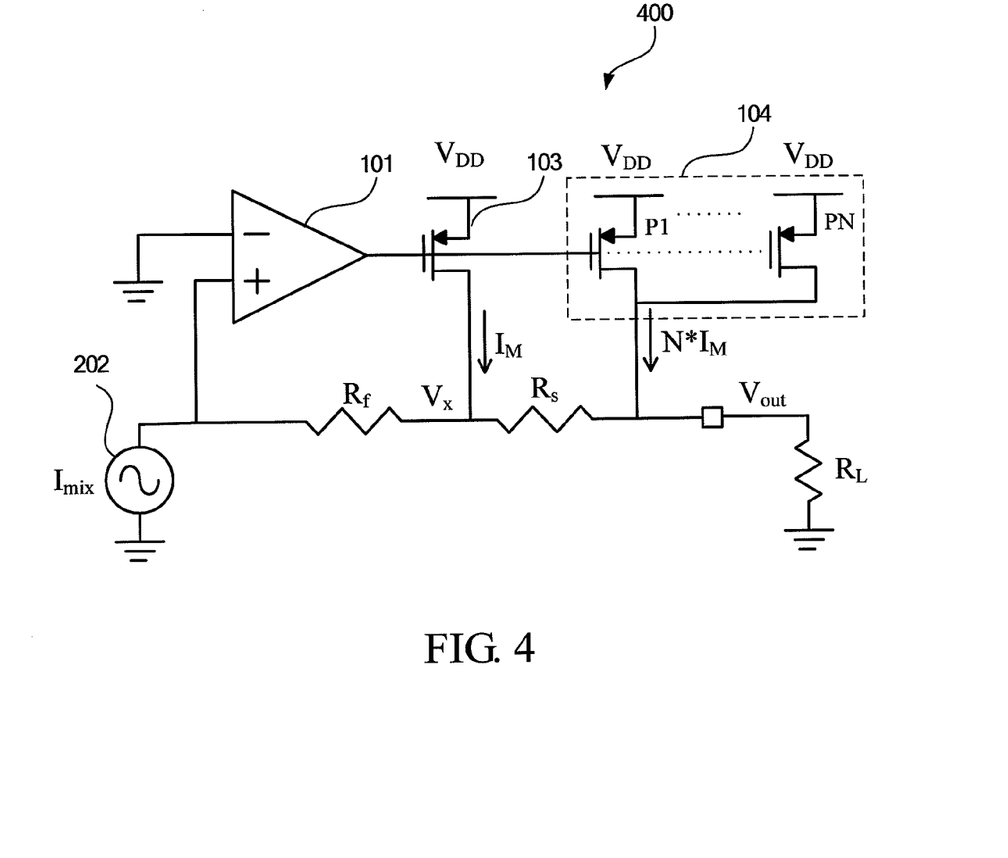
FIG. 4 is an example of a circuit diagram of a single-ended transmission line driver according to an embodiment of the disclosure.

FIG. 4 is a first example of a single-ended transmission line driver according to an embodiment of the disclosure. The transmission line driver 400 includes an amplifier 101, a composite current source 202, a transistor 103, a transistor 104, an impedance matching resistor $R_s$, a loading resistor $R_L$, and a feedback resistor $R_f$. The feedback resistor $R_f$ has one end coupled to the composite current source 202. The transistor 103 has one end coupled to a circuit voltage source $V_{DD}$ and the other end coupled to the other end of the feedback resistor $R_f$. The impedance matching resistor $R_s$ is coupled between the feedback resistor $R_f$ and the loading resistor $R_L$. The transistor 104 has one end coupled to the circuit voltage source $V_{DD}$ and the other end coupled to the loading resistor $R_L$. An on current of the transistor 104 is a preset multiple (N) of the transistor 103. The amplifier 101 has an input end coupled to the feedback resistor $R_f$ and the composite current source 202 and an output end coupled to gates of the transistor 103 and the transistor 104.

After the composite current source 202 is applied, the output voltage $V_{out}$ is fixed, as deduced as follows.

Due to a process variation, the IC internal resistor is varied to be (1+x) times as much as a designed value:

$$R_{s(real)}=R_{s(design)}\times(1+x)$$

$$R_{f(real)}=R_{f(design)}\times(1+x)$$

A current amount of the input composite current source 202 is:

$$I_{mix}=K_1\times(i_b+i_{bx})=K_2\times[V_{bg}+V_{bg}/(1+x)]=K_2\times V_{bg}\times[1+1/(1+x)]$$

The $K_1$ and $K_2$ are constants and the $V_{bg}$ is the bandgap voltage.

Output voltage $V_{out}$:

$$V_{out}=I_{in}\times\frac{N+\frac{(1+N)\times R_{f(real)}}{R_{s(real)}}}{\frac{1}{R_L}+\frac{(1+N)}{R_{s(real)}}}=\left[K_2\times V_{bg}\times\left(1+\frac{1}{1+x}\right)\right]\times$$

$$\frac{N+\frac{(1+N)\times R_{f(design)}\times(1+x)}{R_{s(design)}\times(1+x)}}{\frac{1}{R_L}+\frac{(1+N)}{R_{s(design)}\times(1+x)}}$$

In order to match the impedance, $R_{s(design)}=R_L\times(1+N)$;

$$V_{out}=K_2\times V_{bg}\times R_L\times\left(1+\frac{1}{1+x}\right)\times$$

$$\frac{N+\frac{(1+N)\times R_{f(design)}\times(1+x)}{R_{s(design)}\times(1+x)}}{1+\frac{1}{(1+x)}}=\text{constant}$$

The composite current source $I_{mix}$ according to the disclosure is therefore used as a driving current source of the transmission line driver, such that the output voltage is fixed.

Figure 5:
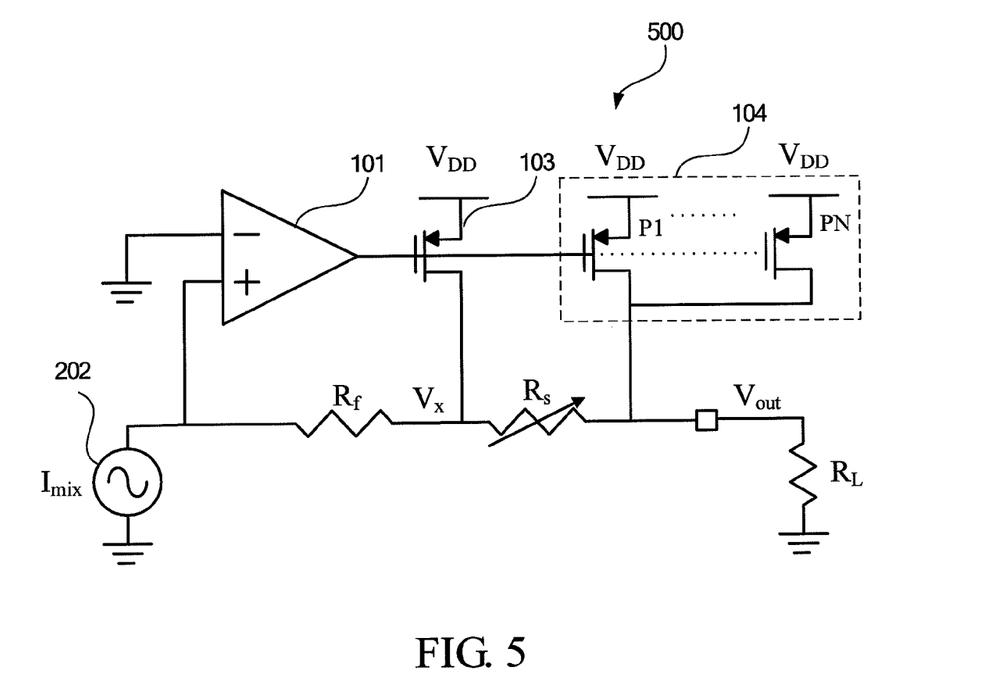
FIG. 5 is another example of a circuit diagram of a single-ended transmission line driver according to an embodiment of the disclosure.

FIG. 5 is a second example of a circuit diagram of a single-ended transmission line driver according to an embodiment of the disclosure. In comparison with FIG. 4, the transmission line driver 500 in FIG. 5 adopts an adjustable impedance matching resistor $R_s$. After production the adjustable impedance matching resistor $R_s$ may be adjustable to match a loading resistor $R_L$, so as to satisfy an impedance matching requirement at the same time.

In the embodiment of FIG. 5, after a composite current source 202 is adopted, the output voltage is approximately fixed at one time and a characteristic impedance value of an output end is correct, as deduced as follows.

Due to a process variation, the IC internal resistor is varied to be (1+x) times as much as a designed value:

$$R_{s(real)}=R_{s(design)}\times(1+x)$$

$$R_{f(real)}=R_{f(design)}\times(1+x)$$

A current amount of the input composite current source 202 is:

$$I_{mix}=K_1\times(i_b+i_{bx})=K_2\times[V_{bg}+V_{bg}/(1+x)]=K_2\times V_{bg}\times[1+1/(1+x)]$$

The $K_1$ and $K_2$ are constants and the $V_{bg}$ is the bandgap voltage.

As the characteristic impedance of the output end is affected due to the process variation, in order to fix the characteristic impedance of the output end, $R_s$ needs to be adjustable, such that $R_{s(real)} = R_{s(design)}$.

In addition, an appropriate relation between $R_f$ and $R_L$ ($N=R_f/R_L$) is selected.

Output voltage $V_{out}$:

$$V_{out} = I_{in} \times \frac{N + \frac{(1+N) \times R_{f(real)}}{R_{s(real)}}}{\frac{1}{R_L} + \frac{(1+N)}{R_{s(real)}}} = \left[ K_2 \times V_{bg} \times \left(1 + \frac{1}{1+x}\right) \right] \times$$

$$\frac{N + \frac{(1+N) \times R_{f(design)} \times (1+x)}{R_{s(design)}}}{\frac{1}{R_L} + \frac{(1+N)}{R_{s(design)}}}$$

In order to match the impedance, $R_{s(design)} = R_L \times (1+N)$;

$$V_{out} = K_2 \times V_{bg} \times \left(1 + \frac{1}{1+x}\right) \times \frac{N + \frac{(1+N) \times N \times R_L \times (1+x)}{(1+N) \times R_L}}{\frac{1}{R_L} + \frac{1}{R_L}} =$$

$$K_2 \times V_{bg} \times \left(1 + \frac{1}{1+x}\right) \times \frac{R_L}{2} \times N \times [1 + (1+x)] =$$

$$K_2 \times V_{bg} \times \frac{R_L}{2} \times N \times \left[1 + \frac{1}{1+x} + (1+x) + 1\right] \cong$$

$$K_2 \times V_{bg} \times \frac{R_L}{2} \times N \times [1 + (1-x) + (1+x) + 1] = \text{constant}$$

Therefore, the appropriate relation between $R_f$ and $R_L$ ($N=R_f/R_L$) is selected, and the output voltage $V_{out}$ is irrelevant to the internal resistor variation x. Therefore, the composite current source 202 according to the disclosure may ensure that the output voltage is approximately fixed at one time and the characteristic impedance value of the output end is correct.

Figure 6:
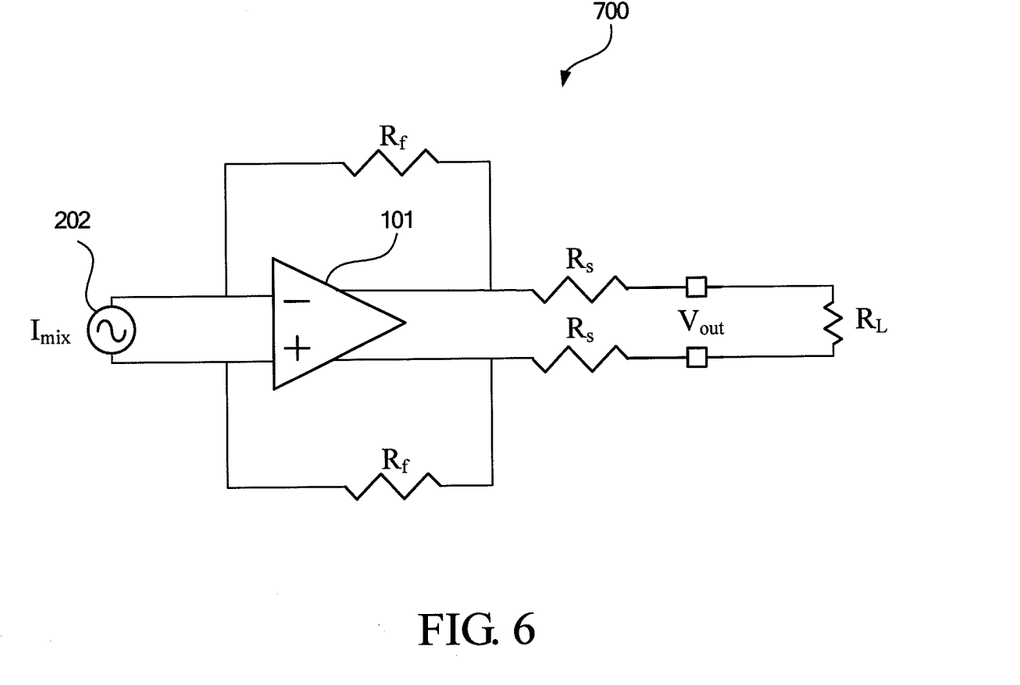
FIG. 6 is an example of a circuit diagram of a differential transmission line driver according to an embodiment of the disclosure.

Next, FIG. 6 is an example of a circuit diagram of a differential transmission line driver according to an embodiment of the disclosure. In other words, a composite current source $I_{mix}$ according to the disclosure is applied to the differential transmission line driver 700 in FIG. 6, such that an output voltage is fixed. The transmission line driver 700 includes a pair of feedback resistors $R_f$, an amplifier 101, and a pair of impedance matching resistors $R_s$. The pair of feedback resistors $R_f$ has one end respectively coupled to two ends of a composite current source 202. The amplifier 101 has two input ends respectively coupled to two ends of the composite current source 202 and two output ends respectively coupled to the other end of the two feedback resistors $R_f$. The pair of impedance matching resistors $R_s$ are respectively coupled between two output ends of the amplifier 101 and two input ends of a loading resistor $R_L$.

Figure 7:
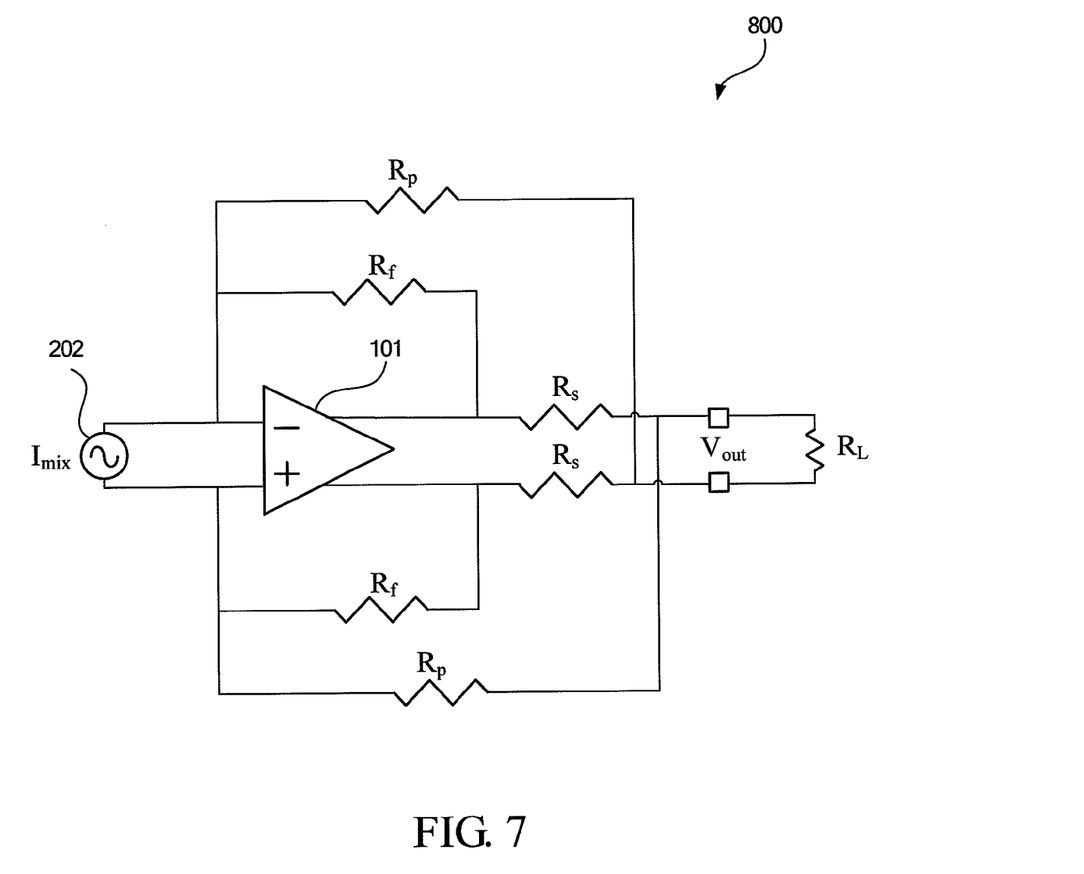
FIG. 7 is another example of a circuit diagram of a differential transmission line driver according to an embodiment of the disclosure.

FIG. 7 is another example of a circuit diagram of a differential transmission line driver according to an embodiment of the disclosure. In other words, a composite current source $I_{mix}$ according to the disclosure is applied to the differential transmission line driver 800 in FIG. 8, such that an output voltage is fixed. The differential transmission line driver 800 includes a composite current source 202, an amplifier 101, a pair of feedback resistors $R_f$, a pair of second feedback resistors $R_p$, and a pair of impedance matching resistors $R_s$. The amplifier 101 has two input ends and two output ends, respectively coupled to two ends of the composite current source 202. The pair of feedback resistors $R_f$ is respectively coupled to two input ends and two output ends of the amplifier 101. The pair of second feedback resistors $R_p$ has a second feedback resistor $R_p$ coupled between one input end of the amplifier 101 and one end of the loading resistor $R_L$ and the other second feedback resistor $R_p$ coupled between the other input end of the amplifier 101 and the other end of the loading resistor $R_L$. The pair of impedance matching resistors $R_s$ is respectively coupled between the two output ends of the amplifier 101 and the two input ends of the loading resistor $R_L$.

In the embodiments of FIGS. 4-6, the composite current source $I_{mix}$ is used as the driving current source. In fact, the composite current source $I_{mix}$ may also be applied to the embodiment in FIG. 1. In the example in FIG. 1, the internal current source 202 is replaced by the composite current source $I_{mix}$ according to the disclosure, such that the output voltage is fixed. In other words, in the examples in FIG. 1 and FIGS. 4 to 7, or in an equivalent circuit, the composite current source $I_{mix}$ is used as a current supplier for the gain circuit, such that the output voltage is fixed.

Figure 8:
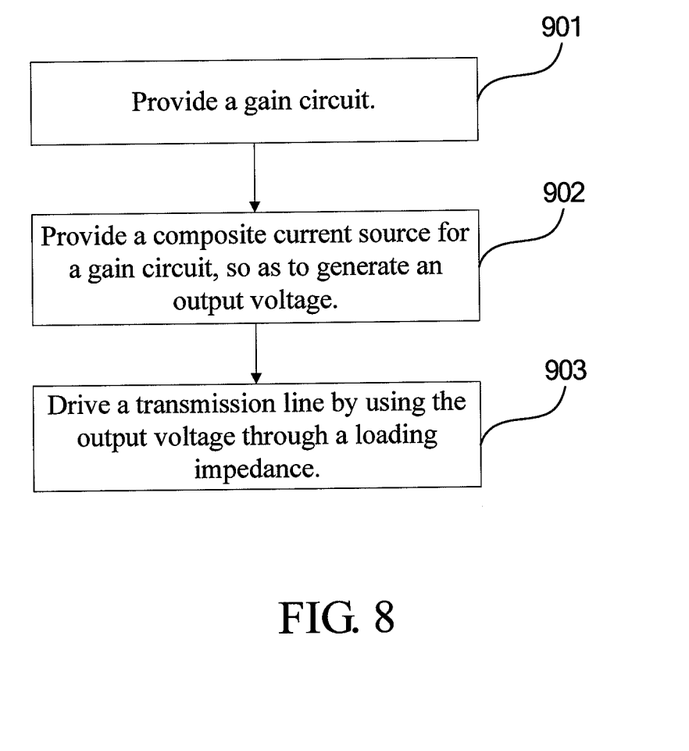
FIG. 8 is a flow chart of a method for driving a transmission line according to an embodiment of the disclosure.

FIG. 8 is a flow chart of a method for driving a transmission line according to an embodiment of the disclosure, in which the method is used to drive a transmission line having a load impedance. The method includes the following steps.

In Step 901, a gain circuit is provided. The examples in FIG. 1 and FIGS. 4 to 7 or an equivalent circuit can be adopted for the gain circuit.

In Step 902, a composite current source is provided for the gain circuit, so as to generate an output voltage. The composite current source is an internal current source ($i_b$) and an external current source ($i_{bx}$).

In Step 903, the transmission line is driven by providing the output voltage through the load impedance.

Therefore, the output voltage is therefore fixed.

While the disclosure has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A transmission line driver implemented in an integrated circuit (IC), for driving a transmission line having a load impedance, comprising:
    a composite current source, comprising:
        an internal current source, generated by a voltage and an internal reference resistor, wherein a value of the internal reference resistor is set during manufacturing of the IC; and
        an external current source, generated by the voltage and an external reference resistor; and
    a gain circuit, coupled to the composite current source, for generating an output voltage, and driving the transmission line by providing the output voltage through the load impedance, wherein the gain circuit is a differential gain circuit that comprises:
        a first impedance pair, having one end respectively coupled to two ends of the composite current source;
        an amplifier, having a pair of input ends and a pair of output ends, wherein the pair of input ends is respectively coupled to the two ends of the composite current source, and the pair of output ends is respectively coupled to the other end of the first impedance pair;

a second impedance pair, having an impedance coupled between one output end of the amplifier and one end of the load impedance, and the other impedance coupled between the other output end of the amplifier and the other end of the load impedance; and a third impedance pair, having an impedance coupled between one input end of the amplifier and one end of the load impedance, and the other impedance coupled between the other input end of the amplifier and the other end of the load impedance.

2. The transmission line driver according to claim 1, wherein a current component proportion of the composite current source from the internal current source and the external current source is 1:1.

3. The transmission line driver according to claim 1, wherein the gain circuit comprises:
 a first impedance, having one end coupled to the composite current source;
 a transistor, having one end coupled to a circuit voltage source, and the other end coupled to the other end of the first impedance; an amplifier, having an input end coupled to the first impedance and the composite current source, and an output end coupled to a gate of the transistor; and a second impedance, coupled between the first impedance and the load impedance.

4. The transmission line driver according to claim 3, wherein the transistor is a P type metal-oxide-semiconductor (PMOS) transistor.

5. The transmission line driver according to claim 1, wherein the gain circuit comprises:
 a first impedance, having one end coupled to the composite current source;
 a first transistor, having one end coupled to a circuit voltage source, and the other end coupled to the other end of the first impedance;
 a second impedance, coupled between the first impedance and the load impedance;
 a second transistor, having one end coupled to the circuit voltage source, and the other end coupled to the load impedance, wherein an on current of the second transistor is a preset multiple of the first transistor; and
 an amplifier, having an input end coupled to the first impedance and the composite current source, and an output end coupled to gates of the first transistor and the second transistor.

6. The transmission line driver according to claim 5, wherein the first transistor and the second transistor are P type metal-oxide-semiconductor (PMOS) transistors.

7. The transmission line driver according to claim 5, wherein the second impedance is an adjustable impedance.

8. The transmission line driver according to claim 1, wherein the voltage is a bandgap voltage.

9. A method for driving a transmission line having a load impedance via a transmission line driver implemented in an integrated circuit (IC), comprising:
 providing a composite current for a gain circuit to generate an output voltage, wherein the composite current comprises an internal current part and an external current part; and
 driving the transmission line by providing the output voltage through the load impedance;
 wherein the internal current part is generated according to an internal reference resistor, and the external current part is generated according to an external reference resistor, wherein a value of the internal reference resistor is set during manufacturing of the IC, wherein the gain circuit is a differential gain circuit that comprises:
  a first impedance pair, having one end respectively coupled to two ends of the composite current source;
  an amplifier, having a pair of input ends and a pair of output ends, wherein the pair of input ends is respectively coupled to the two ends of the composite current source, and the pair of output ends is respectively coupled to the other end of the first impedance pair;
  a second impedance pair, having an impedance coupled between one output end of the amplifier and one end of the load impedance, and the other impedance coupled between the other output end of the amplifier and the other end of the load impedance; and
  a third impedance pair, having an impedance coupled between one input end of the amplifier and one end of the load impedance, and the other impedance coupled between the other input end of the amplifier and the other end of the load impedance.

10. The method according to claim 9, wherein a current proportion between the internal current part and the external current part is 1:1.

* * * * *